United States Patent Office 3,187,587
Patented June 8, 1965

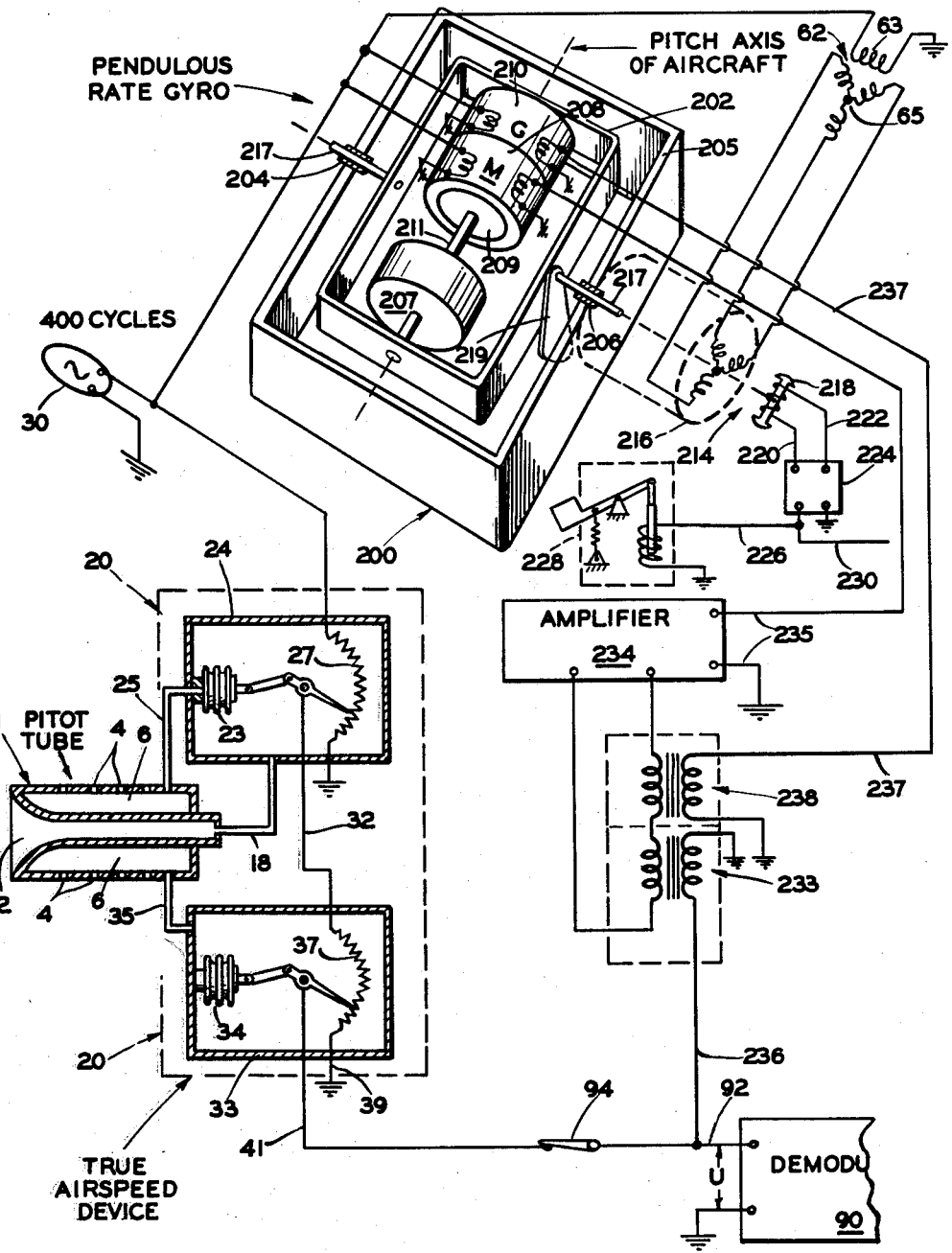

3,187,587
PENDULOUS RATE GYROSCOPE SYSTEM
Charles E. Hurlburt, River Edge, N.J., assignor to The Bendix Corporation, Teterboro, N.J., a corporation of Delaware
Filed Nov. 29, 1962, Ser. No. 240,997
2 Claims. (Cl. 74—5.7)

This invention relates to a novel gyroscopic arrangement to compensate for precessional forces and more particularly to an improved pendulous rate gyroscope system, including means responsive to airspeed of an aircraft carrying the gyroscope to compensate for a tendency of the gyroscope to precess about its bank axis in response to linear and angular accelerational forces acting on the pendulous rate gyroscope.

A free gyroscope tends to remain fixed in space with its spin axis parallel to its original position as the gyroscope support is moved in space by the earth's rotation and by motion of the craft mounting the gyroscope relative to the earth. Also, friction, unbalancing, and other disturbing forces cause movement of the gyro axis and results in errors in the gyro position. Thus the axis of the gyro appears to drift from the original position. To maintain the gyroscope spin axis in the original position, precessing forces must be applied to the gyroscope by an erecting device to compensate for the apparent drift from the original position. The erecting device may include a mass acting as a pendulum, but the mass is subject to accelerational forces resulting from angular acceleration due to turning of the craft and linear acceleration due to changes in the velocity of the craft. These accelerational forces cause the erecting device to erroneously precess the gyro about the bank axis of the gyro, which axis is normally coincident with the bank axis of the craft.

The linear accelerational force acting on a pendulum carried by a moving craft is proportional to the rate of change of ground airspeed of the craft. Also, the centrifugal forces acting on a pendulum carried by a moving craft while making a turn is proportional to the ground speed of the craft and the rate of change of flight path about the vertical.

It is, therefore, an object of the invention to provide a gyroscope embodying a pendulum, novel means referenced with respect to the true airspeed of the craft carrying the gyroscope to vary the rate of rotation of the rotor wheel of the gyroscope so as to compensate for forces tending to effect an erroneous precessing of the gyroscope about its bank axis in response to a torque about the bank axis due to rate of turn of the craft about its vertical axis and to a torque due to centrifugal forces acting on the pendulum.

Another object of the invention is to provide such an improved pendulous rate gyroscope, particularly adapted for use in a control system of a type such as disclosed and claimed in a copending U.S. application Serial No. 240,991, filed November 29, 1962, by Christopher A. Rafferty and assigned to The Bendix Corporation, and which control system may include an erection system for a craft mounted vertical gyroscope having pitch and roll axes with a pitch servo having a pendulous rotor constrained to move only in the plane of pitching of the craft for instituting a pitch erection control signal, a pendulous rate gyroscope constrained to move only in the plane of banking of the craft to institute a bank erection control signal, and means responsive to the control signals for erecting the vertical gyroscope in pitch and bank senses.

Another object of the invention is to provide an improved pendulous rate gyroscope including a gimbal constrained to move only in the plane of banking of the craft and a gimbal mounting a variable speed rotor wheel with its axis of rotation extending parallel to the pitch axis of the craft, together with means referenced with the true airspeed of the craft and arranged to provide a signal to vary the rate of rotation of the variable speed rotor wheel to compensate for forces tending to effect a variation in displacement of the pendulum axis from the true vertical about the bank axis so as to maintain the gimbal in a horizontal plane, together with a synchro means operatively connected to the gimbal so as to provide a bank error signal proportional to the bank attitude of the craft.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a schematic illustration of a pendulous rate gyroscope embodying the invention.

Referring to the drawing, there is indicated generally by the numeral 1 an air pressure probe of conventional type such as a Pitot tube which may be in the free airstream and mounted on the airfoil of an aircraft so as to sense through the passage 2 impact or total pressure which increases with the speed of the aircraft. The static atmospheric pressure is further sensed through passages 4 in the side of the Pitot tube 1 and leading to a passage 6.

As shown in the drawing, the impact or total pressure is applied through a conduit 18 to a pressure sensing mechanism or transducer assembly 20 including a first sensing means comprising a diaphragm 23 and potentiometer pick-off combination. The diaphragm 23 is preferably of a bellows type and is enclosed in a chamber 24. The interior of the bellows diaphragm 23 is connected to static atmospheric pressure through a conduit 25 leading from the passage 6 while the chamber 24 which encloses the diaphragm bellows 23 is connected to a source of total pressure through a conduit 18 leading from the passage 2 of the Pitot tube 1 carried by the craft mounting the pressure sensing mechanism 20.

A potentiometer 27 is operated by the sensing means 23 and is excited by a suitable source 30 of alternating current. The voltage output of the potentiometer 27 of the sensing means 23 is proportional to the square root of the difference between the total pressure ($P_T$) applied through the line 18 and the static pressure ($P_s$) applied through the line 25. The arrangement is such that an output signal voltage is applied through a line 32. This output voltage may be represented mathematically as the square root of $qc$.

The pressure sensing mechanism 20 is further provided with a second sensing means comprising a diaphragm 34 which may be of a bellows type enclosed in a chamber 33. The interior of the bellows 34 may be evacuated while the chamber 33 which encloses the diaphragm bellows 34 is connected to a source of total static pressure through a conduit 35 leading from a passage 6 in the Pitot tube 1. A potentiometer 37 is operatively controlled by the diaphragm bellows 34. The potentiometer 37 is connected at one end to the output lead 32 while the opposite end is connected to the source of alternating current 30 through the ground connection 39. The output lead 32 of the sensing means 23 is thus connected to the potentiometer 37 of the second sensing means 34 to thereby excite the potentiometer 37. There is an output lead 41 from the arm of the potentiometer 37. The diaphragm bellows 34 of the second sensing means 33 varies the effect of the potentiometer 37 as a direct function ($f_1$) of the variation in the static pressure ($P_s$).

The combined output voltages of the first and second sensing means 23 and 34 applied through the output lead 41, is therefore the sum of the potentiometer output voltages of sensing means 23 and 34 which may be mathematically represented as $\sqrt{qc} + f_1(P_s)$, in which $qc = P_T - P_s$ ($P_T$ = total pressure and $P_s$ = static pressure) and which in turn is an approximation of true airspeed (U) of the craft.

The voltage output U of the pressure sensing mechanism 20 is fed through the lead 41 and the operator-operative switch mechanism 94, conductor 92 and demodulator 90 into a true vertical computer which may include a pitch error control channel and a bank error control channel for controlling a vertical gyroscope, as described and claimed in the copending U.S. application Serial No. 240,991, filed by Christopher A. Rafferty, as heretofore explained.

Also leading from the switch 94 is a conductor 236 of a speed control circuit for the pendulous rate gyroscope forming the subject matter of the present invention, as hereinafter explained.

Pendulous rate gyroscope

The bank error control channel, as heretofore disclosed and claimed in the aforenoted U.S. application for patent Serial No. 240,991 of Christopher A. Rafferty may include a pendulous rate gyroscope 200 which forms the subject matter of the present invention. The pendulous rate gyroscope 200 may include a gimbal 202 mounted on gimbal bearings 204 and 206 of a casing 205 which may in turn be affixed to the casing of a vertical gyroscope carried by the aircraft as explained in the aforenoted copending U.S. application Serial No. 240,991 of Christopher A. Rafferty.

The bearings 204 and 206 are positioned in parallel relation with the bank axis of the vertical gyroscope and the gimbal 202 is adjustably positioned about a bank axis 217 by a pendulum 219 affixed to the gimbal 202.

Suitable damping means may be provided between gimbal 202 and the case 205 so as to prevent undesirable oscillations.

Further, mounted on the gimbal 202 perpendicular to the bearings 204 and 206 is a rate gyroscope wheel 207 driven by a vairable speed motor 208 which is also drivingly connected to a rate generator 210. The gyroscope wheel 207, rotor 209 of motor 208, and rotor of rate generator 210 are mounted on a shaft 211 and drivingly connected thereby while the stators of the motor 208 and rate generator 210 are affixed to the gimbal 202. The wheel 207, rotor 209 of motor 208 and rotor of the rate generator 210 may be separately mounted on the shaft 211 and so arranged that all rotate at the same speed or the same may be mounted on a common wheel in a manner well known in the art.

A speed control circuit for the motor 208 is further provided including an amplifier 234 having output leads 235 connected in controlling relation to the motor 208 which may be of a conventional variable speed two phase type having a suitable control winding connected across the output leads 235.

A conductor 236 leads from the operator-operative switch arm 94 and is so arranged as to apply to the input of the amplifier 234 through an isolation transformer 233 the voltage applied through lead 41 and switch arm 94, and which voltage is directly proportional to the true airspeed U of the aircraft.

The rate generator 210 driven by the motor 208 is arranged to apply an output voltage through a negative feedback circuit 237 to the input of the speed control amplifier 234.

This negative feedback voltage is applied through an isolation transformer 238 in opposition to the speed controlling signal applied through the isolation transformer 233 and in such a manner that the speed of the rate gyroscope wheel 207 driven by the motor 208 is varied as a direct function of the airspeed of the craft, as hereinafter explained.

There is further provided a signal output variable inductive device such as bank synchro 214 having a stator 216 and a rotor 218. The synchro stator 216 is fastened to the casing 205 while the synchro rotor 218 is mechanically connected to a shaft 217 projecting from gimbal 202. The stator winding 216 of synchro 214 provides an output signal proportional to the banking angle of the craft and may be electrically connected back to back to the stator winding 65 of a suitable bank erection synchro 62 having a rotor winding 63 electrically connected to the source of alternating current 30 and operatively adjusted by the positioning of a gimbal of a vertical gyro, as explained in the aforenoted copending U.S. application Serial No. 240,991 of Christopher A. Rafferty. Further, as explained in the aforenoted application, the winding of the rotor 218 is connected by conductors 220 and 222 to the input of an amplifier 224 which in turn is connected by a lead 226 to monitor 228 and by lead 230 to the control winding of a bank torquer motor of the vertical gyroscope.

In the improved structure of the present invention, the speed control circuit of the motor 208 includes the amplifier 234, which, with the switch 94 in the closed position, is excited by the voltage applied by the lead 41 which is a function of the true airspeed U of the aircraft and a voltage output from the rate generator 210 driven through shaft 211 by the motor 208 so that the speed of rotation of the rate gyroscope wheel 207 is varied as a function of the airspeed of the aircraft. The arrangement is such that, as hereinafter explained, the pendulum 219 always hangs vertical and the gimbal 202, is maintained thereby in a horizontal position.

The pendulous rate gyroscope gimbal 202 is constrained to move only in the plane of the banking motion of the craft mounting the gyro. The pendulous rate gyroscope is restrained from precessing about its bank or roll axis on bearings 204 and 206 only by the pendulosity associated with the gimbal 202.

For a given rate of co-ordinated turn of the craft mounting the gyro 200, a given degree of pendulosity associated with the gyro gimbal 202, and a fixed angular momentum, there is one definite true airspeed at which the gimbal 202 will be maintained in a horizontal plane. Under these conditions, the precessional torque produced by the rotational gyroscopic effect of the rate gyro wheel 207 tending to maintain gimbal 202 in a horizontal position is equal and opposite to the torque produced by centrifugal force on the gimbal mass unbalance.

The centrifugal forces on the pendulous gyro gimbal 202 when the craft mounting the gyro is in a level coordinated turn varies as a direct function of the velocity of the craft and the rate of turn of the craft. It will be seen, therefore, that if the angular momentum of the gyro wheel 207 is varied linearly as a direct function of the true airspeed of the craft, the gyro gimbal 202 will be maintained in a horizontal plate for all turns at all airspeeds. To achieve this end, the speed control circuit, including the amplifier 234, is so provided as to drive rate gyro motor 208 and the rate generator 210 at a rate proportional to the true airspeed of the craft.

The rate generator 210 is so calibrated as to generate a signal proportional to the rate of the speed of rotation of the wheel 207, and which signal is fed back through lead 237 into the input of amplifier 234 in opposition to the controlling input voltage proportional to U so as to assure that the speed of rotation of the gyroscopic wheel 207 is proportional to the true airspeed of the craft.

The speed of rotation of the rate gyro wheel 207 is by this means accurately maintained proportional to the true airspeed U of the craft. This assures that the pendulum 219 will always hang in a vertical position irrespective of the airspeed of the craft and the rate of turn thereof. This result is effected because the gyroscopic torque effected by the wheel 207, rotor 209 of motor 208, and rotor of generator 210 which have a rotational speed proportional to the airspeed of the craft is balanced by the torque due to the centrifugal force on the pendulous mass 219 attached to the gyro gimbal 202. Thus the pendulum 219 will hang vertical and the gimbal 202 will be maintained in the desired horizontal position.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A pendulous rate gyroscope comprising a casing, a gimbal pivotally mounted in the casing along a bank axis of an aircraft, a pendulum affixed to the gimbal and pivotal about the bank axis, a gyroscopic rotor mounted on an axis perpendicular to the bank axis and along a pitch axis of the aircraft, a motor having a speed control winding, and a signal rate generator, said motor and rate generator having rotor elements mounted along said pitch axis, the rotor element of said motor drivingly connected to said gyroscopic rotor and the rotor element of said signal rate generator and so arranged that the gyroscopic rotor, the rotor element of the motor and the rotor element of the signal rate generator rotate at the same speed, means responsive to the speed of flight of said aircraft to apply a signal to said control winding for controlling the speed of rotation of the rotor element of said motor, means for applying a negative feedback signal from said signal rate generator to said control winding of the motor acting in opposition to the controlling signal in an arrangement such that the speed of the gyroscopic rotor is varied as a direct function of the speed of flight of the aircraft so as to cause the pendulum to hang vertical and the gimbal to be maintained thereby in a horizontal position.

2. The combination defined by claim 1 including a shaft mounted in the gimbal and projecting perpendicular to the bank axis, said shaft having an axis coincident with the pitch axis of the aircraft, the gyroscopic rotor being affixed to the shaft, and the motor, and the signal rate generator having stator elements affixed to the gimbal, the rotor element of the motor being drivingly connected through the shaft to the gyroscopic rotor and the rotor element of the rate generator whereby the gyroscopic rotor, the rotor element of the motor and the rotor element of the signal rate generator are all driven at the same speed.

References Cited by the Examiner

UNITED STATES PATENTS 2,595,268   5/52   Kellogg _____ 74—5.7
2,786,357   3/57   Quermann et al. _____ 74—5.7

BROUGHTON G. DURHAM, *Primary Examiner.*

MILTON KAUFMAN, *Examiner.*